July 21, 1931.  L. H. BLOOD  1,815,647
BROACHING MACHINE
Filed Nov. 13, 1926
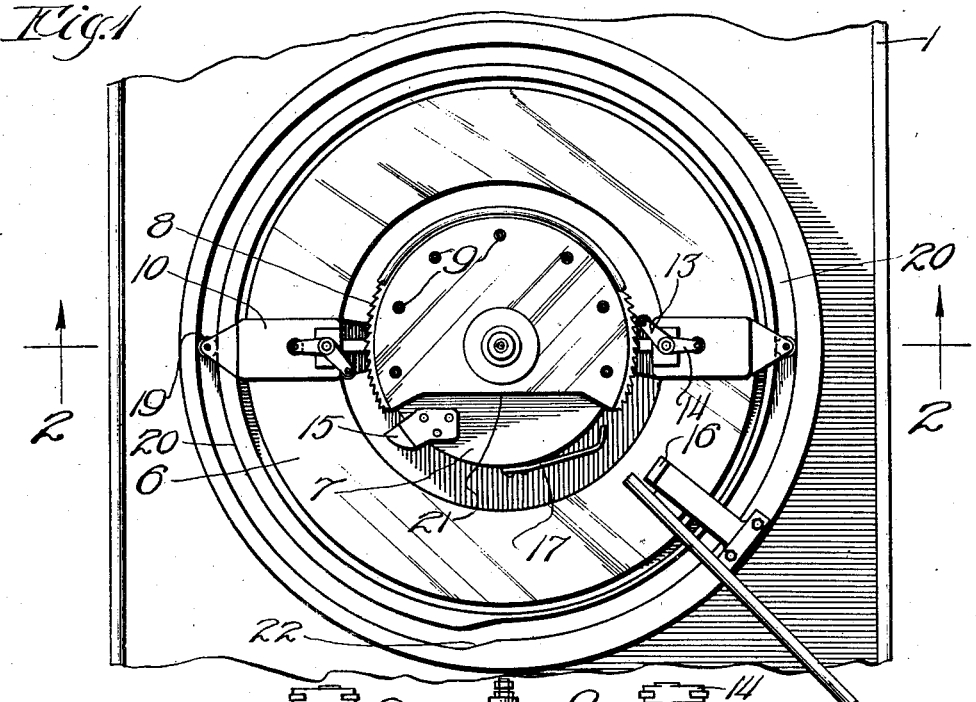
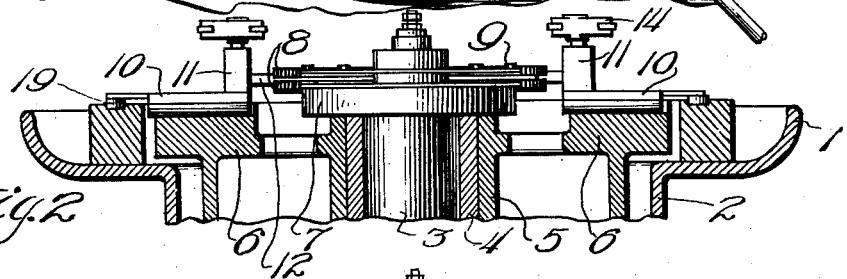
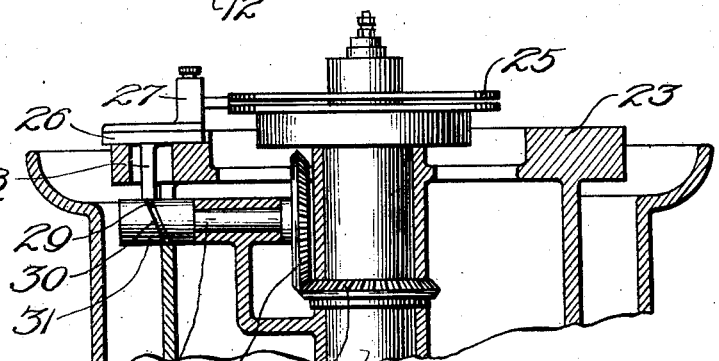
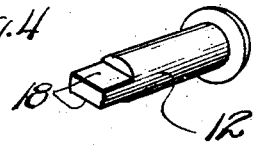
Inventor
L. H. Blood
By H. K. Parsons
Attorney Patented July 21, 1931

1,815,647

UNITED STATES PATENT OFFICE

LOUIS H. BLOOD, OF CINCINNATI, OHIO, ASSIGNOR TO THE CINCINNATI MILLING MACHINE COMPANY, OF CINCINNATI, OHIO, A CORPORATION OF OHIO

BROACHING MACHINE

Application filed November 13, 1926. Serial No. 148,183.

This invention relates to improvements in machine tools and has particular reference to an improved machine for the performance of broaching or similar operations.

One of the objects of the present invention is the provision of an improved machine tool for the porformance of broaching or similar operations with a circular cutter as distinguished from the elongated cutters previously employed for broaching operations.

A further object of the invention is the provision of novel and improved control mechanism for regulating the position of the work during the operation cycle.

Other objects and advantages of the present invention should be readily apparent by reference to the following specification taken in connection with the accompanying drawings, and it will be understood that I may make any modifications in the specific structural details hereinafter described within the scope of the appended claims, without departing from or exceeding the spirit of the invention.

Figure 1 is a plan view of a machine tool, embodying my improvements.

Figure 2 is a vertical section as on the line 2—2 of Figure 1.

Figure 3 is a similar section illustrating a modified form of the invention.

Figure 4 is a perspective view of the work piece.

In the drawings in which similar characters of reference denote corresponding parts throughout the several views, the numeral 1 designates the base of the machine having the hollow column 2 and the central cylindrical portion 3 on which is mounted the bearing sleeve 4. Circumscribing the sleeve 4 is the cylindrical hub 5 of the rotary table 6, to which power may be applied in any suitable manner to cause preferably a continuous rotation thereof.

Mounted upon the central post 3 is the cutter supporting table 7 to which is secured the cutter or cutters 8, as by the bolts 9.

In the form of the invention shown in Figures 1 and 2 the cutter member is stationarily held upon the post, and the rotary work table 6 is provided with a plurality of slides 10, each bearing a work supporting fixture or clamp 11 for a work piece 12. These clamps have the actuating arms 13 and 14 respectively, intended for engagement by the abutments 15 and 16 to alternately close and open the clamps of the fixtures for securing a work piece during the operative portion of the stroke or rotation of the work fixture and releasing the work for automatic ejection by spring 17 as the work is completed and before the fixture reaches the loading station.

It will be understood that the work to be done by the particular machine here illustrated consists in the formation of flats as indicated at 18 on the shanks of work pieces 12 or like similar operations. If this cut is to be performed by broaching as distinguished from the use of a high speed rotary milling cutter or the like, it is necessary that there be a gradual relative progressing or advancing movement take place between the operative face of the cutter and the work. This, of course, may be effected either by a shifting of the cutter or a shifting of the work. In the present instance, however, as it is desired to use a multiplicity of fixtures all simultaneously engaging the cutter, it is not feasible to endeavor to effect the feeding movement by shifting of the cutter. I have therefore provided novel and improved mechanism for shifting the individual work holders with respect to the single stationary broaching cutter. Each of the work fixture supporting slides 10 are provided with an anti-friction roller 19, the several rollers riding in the cam track 20 supported by the column portion 2 of the base of the machine.

It will be noted that the cutter shown has a relieved or cut away portion as at 21 which represents the loading position for the work, the work being loaded into a fixture when the latter is opposite portion 21 of the cutter. The table then rotates in a clockwise direction carrying with it the loading fixture, in which the work will be clamped by interengagement of parts 13 and 15. The work is then carried along in engagement with the cutter as indicated in Figure 1, roll 19 following the eccentric or cam path 20, so that the slide is gradually fed inward in the movement of the fixture from an eight o'clock to a four o'clock position. Comparison of the position of the two fixtures shown in this figure will clearly bring out the relative movement effected by path 20.

As mentioned, movement of the fixture past abutment 16 causes this abutment to release the work clamp and permits spring 17 to eject the work, so that the fixture is then in an unloaded condition when at the front of the machine opposite the portion 21 of the cutter.

This permits the operator to insert a new work piece without stopping or checking the rotation of the table. As the table continues to rotate the roller will be moved outward by the abrupt rise at 22, so that the end of the work will readily clear the shoulder at the edge of the cutter, and can be properly fed into the teeth of the cutter during the rotary movement, by action of the cam path.

Figure 3 shows a variant of the foregoing in which the work supporting table 23 is stationary and the central post or shaft 24 rotates carrying with it the circular cutter 25. In this instance slides 26 support the work holding fixtures 27 and have a depending bracket 28 terminating in a roll 29, engaged in groove 30 of cam 31. This cam is mounted on a shaft 32, driven through miter gear 33 by a miter gear 34 on the shaft 24. By this arrangement the work, slide and fixture will be caused to have an in and out movement, cam controlled, similar to that just described, except that there is an individual cam for each fixture and the fixture performs a complete stroke for each rotation of the cutter and its spindle.

From the foregoing description it will be seen that I have provided a simple and efficient form of broaching machine in which a rotary broach having an operative surface of less than 360° may be satisfactorily employed for progressive stock removal and may be caused to simultaneously operate upon a plurality of work pieces.

I claim:—

1. A broaching machine, including a bed, a column rising therefrom, a table rotatably supported by the column, a post rising above the column, a segmental cutter rigidly mounted on the post concentric therewith, work supporting slides permanently mounted on the table and movable toward and from the cutter, automatic means for clamping work to the slides, and cam means on the bed cooperating with the slides for positively imparting a progressive in and out movement to said slides, and cooperating with said automatic means to prevent undue movement of the slides during clamping of the work thereto.

2. A broaching machine, including a bed, a column rising therefrom, a table rotatably supported by the column, a post rising above the column, a segmental cutter rigidly mounted on the post concentric therewith, slides permanently mounted on the table and movable toward and from the cutter, cam means on the bed cooperating with the slides for positively imparting a progressive in and out movement to said slides, automatic clamp mechanism carried by the slides, and means on the post in advance of the active portion of the cutter for activating individual clamps to secure the work in position prior to the engagement of the cutter therewith, said cam means cooperating with the clamp mechanism to prevent longitudinal movement of the slide during the clamping operation.

3. A broaching machine, including a bed, a column rising therefrom, a table rotatably supported by the column, a post rising above the column, a segmental cutter rigidly mounted on the post concentric therewith, slides permanently mounted on the table and movable toward and from the cutter, cam means on the bed cooperating with the slides for positively imparting a progressive in and out movement to said slides, automatic clamp mechanism carried by the slides, means on the post in advance of the active portion of the cutter for activating individual clamps to secure the work in position prior to the engagement of the cutter therewith, and additional means carried by the bed and overlying the table for shifting the clamp into inoperative position subsequent to disengagement of the cutter with the work piece carried by the individual clamp, said cam means cooperating with the clamp operating means to prevent any reactionary movement of the slides.

4. A broaching machine, including a bed, a column rising therefrom, a table rotatably supported by the column, a post rising above the column, a segmental cutter rigidly mounted on the post concentric therewith, slides permanently mounted on the table and movable toward and from the cutter, cam means on the bed cooperating with the slides for positively imparting a progressive in and out movement to said slides, automatic clamp mechanism carried by the slides, means on the post in advance of the active portion of the cutter for activating individual clamps to secure the work in position prior to the engagement of the cutter therewith, additional means carried by the bed and overlying the table for shifting the clamp into inoperative position subsequent to disengagement of the cutter with the work piece carried by the individual clamp, and resilient means carried by the post for compression by the work prior to release thereof for positively ejecting a finished work piece when the clamp is automatically released.

In testimony whereof I affix my signature.

LOUIS H. BLOOD.

CERTIFICATE OF CORRECTION.

Patent No. 1,815,647.  Granted July 21, 1931, to

LOUIS H. BLOOD.

It is hereby certified that error appears in the above numbered patent requiring correction as follows: In the heading to the printed specification, line 5, for "Serial No. 148,183" read 148,182; and that the said Letters Patent should be read with this correction therein that the same may conform to the record of the case in the Patent Office.

Signed and sealed this 6th day of October, A. D. 1931.

(Seal)

M. J. Moore,
Acting Commissioner of Patents.